INVENTOR
WINFRED A. OLIVER, JR.
BY Shanley & O'Neil
ATTORNEYS

July 15, 1969     W. A. OLIVER, JR     3,455,232
IMMERSION COOKING APPARATUS
Filed Oct. 3, 1967     3 Sheets-Sheet 2

INVENTOR
WINFRED A. OLIVER, JR.
BY *Shanley & O'Neil*
ATTORNEYS

July 15, 1969 W. A. OLIVER, JR 3,455,232
IMMERSION COOKING APPARATUS
Filed Oct. 3, 1967 3 Sheets-Sheet 3
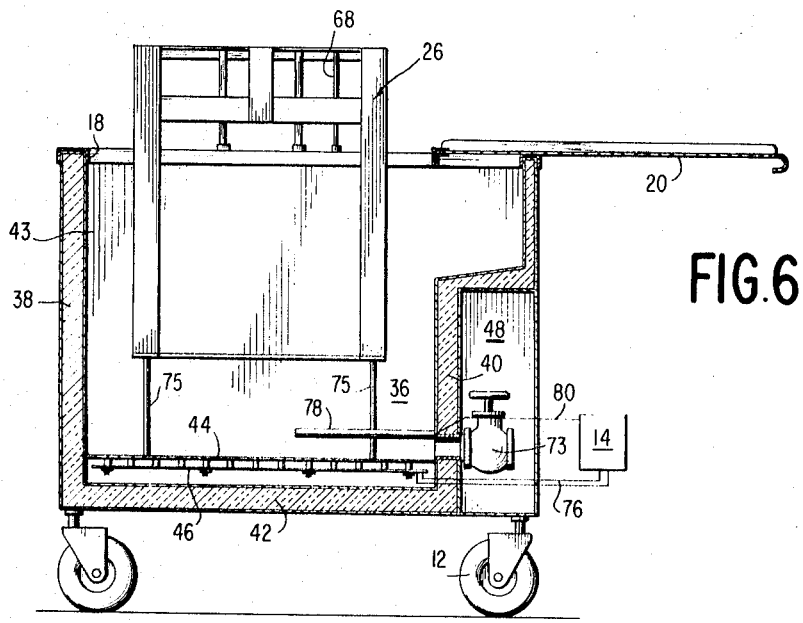
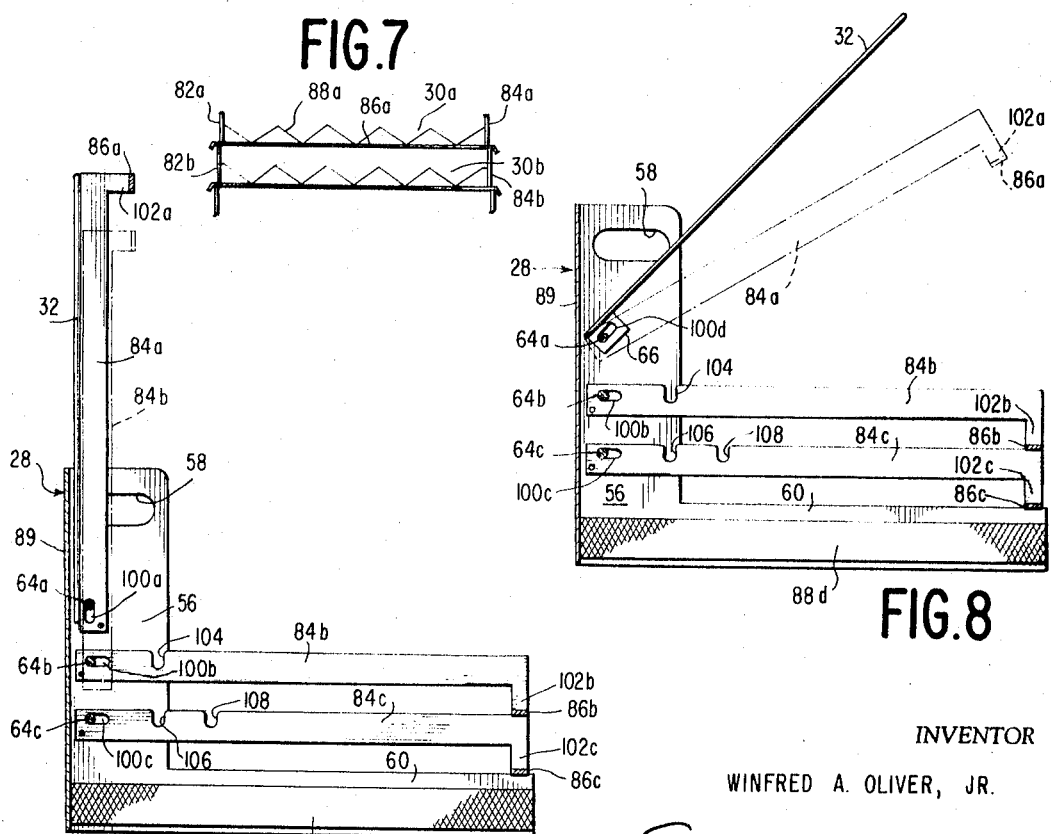
INVENTOR
WINFRED A. OLIVER, JR.
BY *Shanley & O'Neil*
ATTORNEYS

United States Patent Office 3,455,232
Patented July 15, 1969

3,455,232
IMMERSION COOKING APPARATUS
Winfred Allen Oliver, Jr., Dallas, Tex., assignor to Aid, Inc., Chicago, Ill., a corporation of Delaware
Filed Oct. 3, 1967, Ser. No. 672,627
Int. Cl. A47j 37/12; A23l 3/02
U.S. Cl. 99—407                  10 Claims

ABSTRACT OF THE DISCLOSURE

An immersion cooking apparatus having a rack assembly carrying multi-tiered trays and a cooking vat. Lifting apparatus are provided to lower the rack assembly into the vat for cooking the contents thereof and raising the rack assembly from the vat for unloading. The trays individually segregate and constrain articles of food to be cooked and are pivotally movable so as to nest on the rack for loading and unloading purposes.

---

This invention relates generally to cooking apparatus and more particularly to apparatus for cooking foods by immersion in hot fluids, such as deep frying, rosin baking or the like.

The invention is described as specifically applied to rosin baking of potatoes. However, it should be understood that the invention can be used in other cooking processes, for example, in deep vat frying of meats, vegetables, pastries, and the like.

In the prior art method of rosin baking of potatoes, the potatoes are dropped into a pot of hot rosin and, approximately 15 to 20 minutes prior to completion of cooking, the potatoes rise to the surface of the vat. The quantity of potatoes that can be cooked in a vat at any one time is therefore limited by the available surface area in the vat. A similar problem exists in cooking other items.

Potatoes, cooked by the rosin vat process, require subsequent draining to remove excess rosin. It is also preferable to wrap the potatoes in individual wrappers while remaining rosin is still molten. The cooked potatoes should be positioned so that the draining rosin can return to the vat. Furthermore, due to the high melting point of rosin, the cooked potatoes should be positioned so that they may be lowered back into the vat to maintain the rosin in a molten state until individual wrapping is completed. The prior art devices required time consuming extra handling of the items being cooked and the equipment being used in order to accomplish the desired results.

This invention provides an immersion cooking apparatus particularly suited for rosin baking of potatoes which overcomes the disadvantages of the prior art by providing means to accommodate a greater number of potatoes in the cooking vat than was heretofore practicable. Such means comprises a rack which carries multiple tiered trays formed such that the individual potatoes are suitably constrained and segregated from one another during the cooking process. By such arrangement, the quantity of potatoes which can be cooked at one time in the vat is increased as a function of the volume of a vat rather than the surface area of the vat as in the prior art.

The invention further provides means to raise and lower the rack from the vat for initiating or terminating the cooking process of potatoes and provides for readily loading and unloading the potatoes during the cooking process. The invention also retains the potatoes in a drainage position over the vat while at the same time suitably positioning them for return into the vat to maintain the residual rosin on the potatoes molten during wrapping.

The invention also provides means to quickly and easily remove or load the potatoes in a tier-by-tier manner, without disassembly of the rack, by providing trays pivotal between a horizontal operational position and a vertical nesting position. By pivoting the racks individually to a vertical position after unloading each, the next subjacent rack of potatoes is exposed for unloading and wrapping.

It is also contemplated that means may be provided for automatically raising the rack upon termination of the cooking process.

These and other objects and advantages of the invention will become better understood to those skilled in the art by reference to the following detailed description, and the accompanying drawings, wherein:

FIGURE 6 is a sectional elevational view of the apparatus of FIGURE 1 taken along a transverse line running therethrough;

FIGURE 7 is a front elevational view of a portion of the apparatus of FIGURE 1;

FIGURE 8 is an elevational view in section showing a portion of the apparatus of FIGURE 1 in enlarged detail; and FIGURE 9 is a view similar to FIGURE 7 showing the portion of the apparatus in a different operational configuration.

Figures 1, 2:
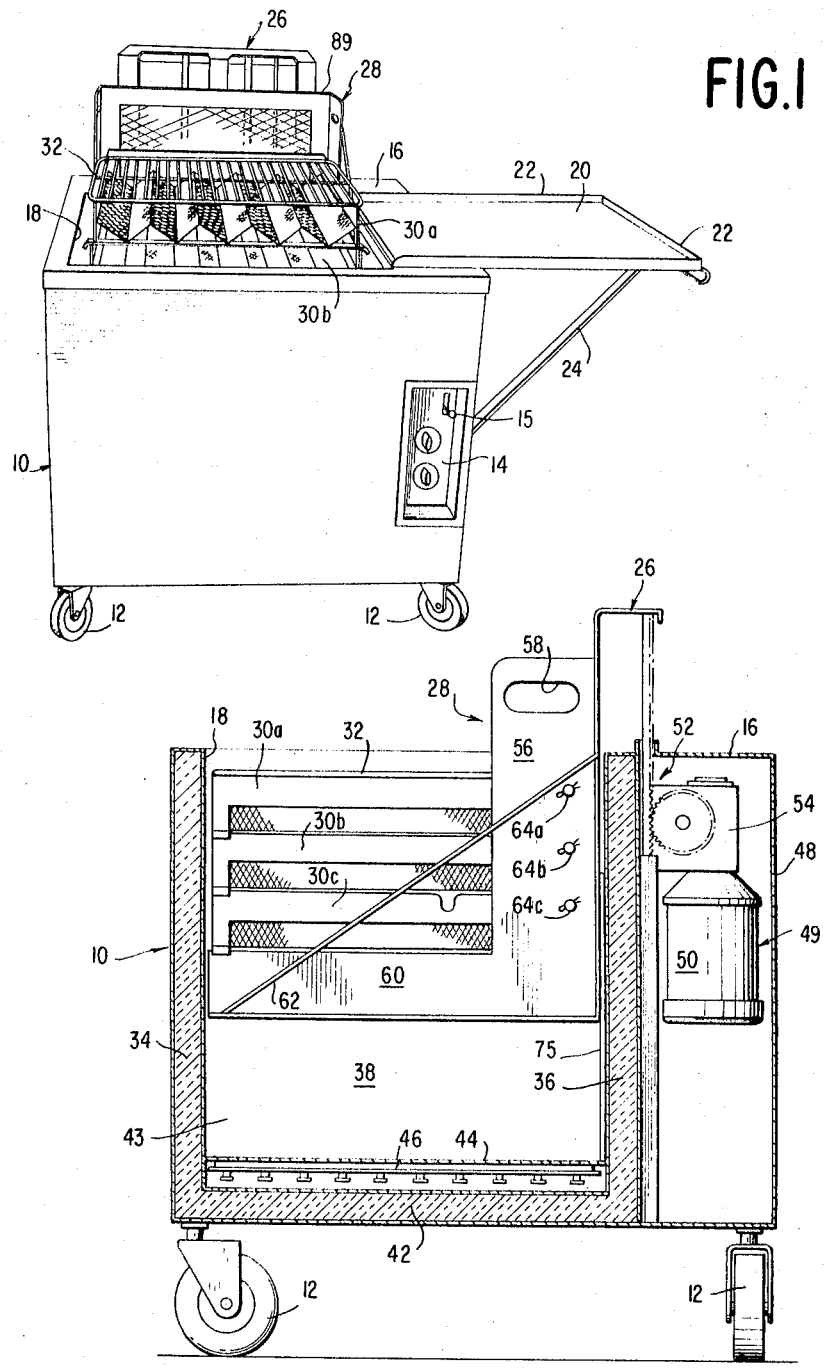
FIGURE 1 is a front perspective view of apparatus in accordance with the invention.
FIGURE 2 is a side elevational view, in enlarged section, of the apparatus of FIGURE 1.

The apparatus of FIGURE 1 comprises an open top cabinet, shown generally at 10, mounted on casters 12. A control panel 14 is recessed in the cabinet 10 and provides a mounting for controls for such variables as cooking temperature and time. A toggle switch 15 provides means to raise and lower a lift portion of the apparatus. The cabinet 10 is provided with a top surface 16 through which an opening 18 provides access to the interior. A door 20 is hinged to top surface 16 proximate one edge of opening 18 and is shaped to close over opening 18. The free edges of the door 20 are provided with upstanding walls 22. The door 20 is supported in the position shown in FIGURE 1 by a detachable diagonal brace 24 extending between the outer edge of the door and the side of the cabinet 10.

As shown in FIGURE 1, rack 26, carrying a support 28, extends from the opening 18 in the cabinet 10. A plurality of trays are attached to the support 28.

The invention provides novel tray configuration which improve operational efficiency of the device. Trays 30a and 30b can be seen in FIGURE 1. A cover grid 32 is supported over the uppermost tray 30a.

Referring to FIGURE 2, the cabinet 10 comprises double, insulation filled front, back and side walls 34, 36, 38 and 40 (FIGURE 6) and a double, insulation filled bottom wall 42. A horizontal plate 44, provided with heaters 46, on the bottom surface thereof, is disposed in spaced parallel relationship to the bottom wall 42, to define, in conjunction with the walls 34 through 40, a cooking vat 43.

The heaters 46 are preferably resistance heaters of any type known in the art such, for example, as Chromalox No SE 2501, rated 1000 watts at 250 volts.

The insulation between the double walls may comprise an evacuated space or may be formed of any suitable insulating material such, for example, as fiberglass or the like. A removable back panel 48, in conjunction with the top surface 16 and extensions of the side walls 38 and 40 and bottom wall 42, forms an enclosure adjacent the back wall 36 for housing a drive mechanism, generally indicated at 49. The drive mechanism 49 comprises an electric motor 50, connected to a suitable source of electric power (not shown), to drive a rack and pinion gear, generally indicated at 52, through a gear box 54. The rack portion of the rack and pinion gear 52 is connected to the rack 26 so that, upon suitable actuation of the rack and pinion by the motor 50, the rack 26 is raised or lowered in the vat 43 as desired.

The support 28 comprises a pair of vertical side members 56 having a hand grip opening 58 disposed at their upper ends, and horizontal members 60 at their lower ends. A diagonal brace 62 extends between vertical member 56 and horizontal member 60.

Part of the contribution of the present invention is the novel mounting features and novel operative features for trays 30a through 30c. Provision for pivotally mounting these trays is made through transversely extending axles 64a through 64c.

Figure 3:
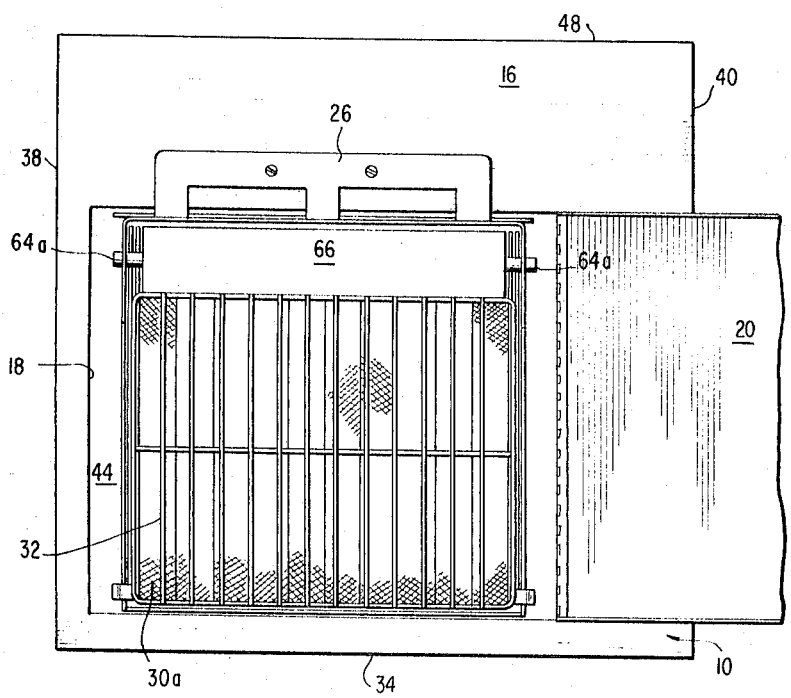
FIGURE 3 is a partial top plan view of the apparatus of FIGURE 1.

As seen in FIGURE 3, the grid 32 is pivotally mounted through horizontal plate 66.

Figure 4:
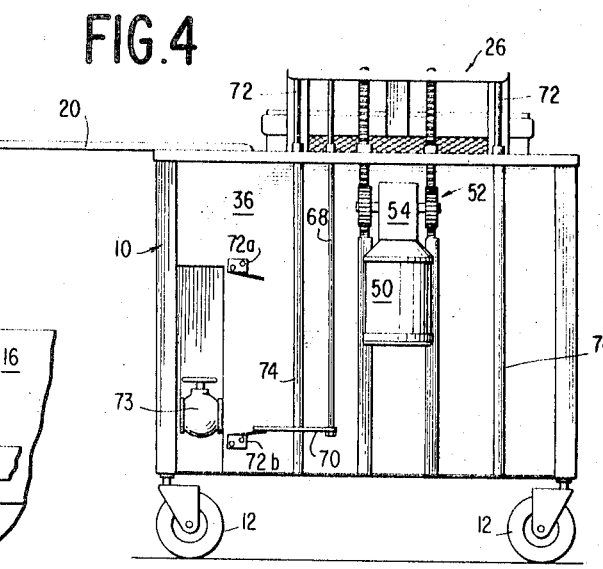
FIGURE 4 is a rear elevational view of the apparatus of FIGURE 1 with a portion removed to illustrate details of the actuating mechanism.

FIGURE 4 is a rear view of the apparatus with the back panel 48 (FIGURE 2) removed showing motor 50, gear box 54 and rack and pinion gearing 52. A follower arm 68 moves with rack 26, contact arm 70 extends from arm 68. A pair of microswitches 72a and 72b are disposed to be actuated by contact arm 70 at the upper and lower limits of travel of rack 26. The microswitches 72a and 72b are connected to de-energized drive motor 50 and stop movement of the rack as arm 70 engages the appropriate microswitch.

It should be obvious that, in lieu of the specific drive mechanism illustrated, other actuating mechanisms such, for example, as hydraulic rams, or the like, may be used within the scope of the invention.

Figure 5:
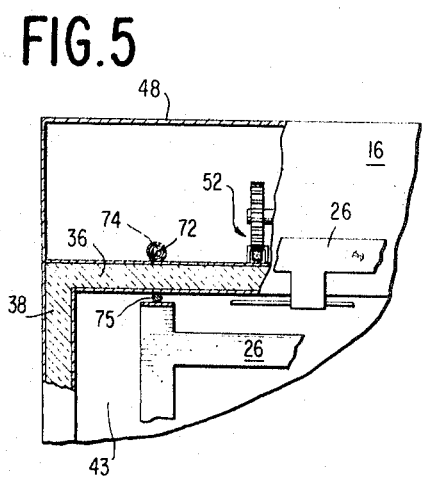
FIGURE 5 is a sectional, enlarged, fragmentary plan view, showing a portion of the apparatus of FIGURE 1.

A valve 73 communicating with vat 43, permits the draining of hot cooking fluid out of the vat when desired. Referring to FIGURES 4 and 5, a pair of guide rods 72 depend from either end of rack 26. A pair of rod receiving tubes 74, mounted to housing 10, telescopically receive the guide rods. A pair of vertical skid rods 75 are mounted to the back wall 36 of the vat 43.

In the transverse section of FIGURE 6, the support and trays are removed from rack 26. The heaters 46 are schematically shown, connected to the control 14 through conductors 76. A temperature sensing element 78, disposed in the vat 43 is connected through conductor 80 to the control 14. The control 14, through switching elements known in the art, provides means to supply heat to the vat 43 through the heating elements 46 so that desired temperature level is monitored and controlled through temperature sensing element 78.

FIGURE 7 shows a forward edgewise view of trays 30a and 30b. Tray 30a includes a pair of spaced, parallel side walls 82a and 84a interconnected by a cross member 86a. The cross member 86a extends beyond the side walls 82a and 84a and is provided with downturned ends, formed to engage the side walls 82b and 84b of tray 30b in the horizontal rack position. Perforated support floor 88a has a symmetrical saw tooth wave form in cross section and extends between the side walls 82a and 84a. This form divides the area of the floor into troughs running parallel to the side walls. The peaks of the troughs thus formed are below the upper edges of the side walls 82a and 84a. As also can be seen in FIGURE 7, the corresponding side walls of the next lower tray 30b are separated by a slightly greater distance than the walls 82a and 84a. Similarly, the side walls of the next succeeding subjacent tray are separated by a slight greater distance. The downturned ends of the cross members 86 of the succeeding subjacent trays are also disposed at greater widths to engage the increased width of the side walls of the next subjacent tray, etc.

This novel configuration provides for spaced support of the trays while in the horizontal position and interfitting nesting of the trays when in the vertical position. In FIGURES 8 and 9, the support and tray structures are shown in side elevation detail in various operational positions to illustrate the functioning of the trays and support structure. The vertical members 56 of support 28 are interconnected by a back member 89 which can be mesh screening as seen in FIGURE 1. Tray 84a through 84c are illustrated with the saw tooth tray floors removed for purposes of clarity. Perforated bottom 88d and the perforated tray floors 88a through 88c permit passage of cooking fluid.

Vertical side wall members 82a through 82c and 84a through 84c have axle-receiving, elongated slots 100a through 100c at their pivoted ends. Grid plate 32 is also provided with plate 66, which has axle-receiving, elongated slots 100d.

To facilitate compact nesting of the trays when in the vertical position the side walls of the trays are notched to receive the axles 64a, b, etc. For example, side wall 84b is provided with notch 104 disposed to receive the axle 64a when the tray is in the vertical position. Side wall 84c is provided with a pair of notches 106 and 108 which are disposed to receive the axles 64a and 64b when tray 30c is in the vertical position.

In operation, tray 30c is loaded, while trays 30a and 30b are in the vertical nested position. After loading tray 30c, tray 30b is lowered from its vertical nested position for loading, etc. Trays are unloaded in reverse order from loading order and are nested, out of the way, upon unloading. The still loaded trays remain in position for redipping as needed.

Referring particularly to FIGURES 1 and 6, the vat 43 is filled with rosin. The level of filling, consonant with the depth of the vat and the volume of potatoes to be cooked, should be such that there is sufficient depth above the surface of the rosin, after displacement thereof by the potatoes, that fluid may safely foam without overflowing the vat. Although, in baking potatoes, any pine rosin standard in the prior art may be used for this purpose, it has been found that HV Estergum has a sufficiently high flash point and combustion or ignition point to provide suitable safety factors for the apparatus. Obviously, if other types of food, such as chicken, fish, beef, etc. are to be cooked in the apparatus, cooking oils would be substituted for the rosin.

After loading the vat 43 with the cooking fluid, the heaters 46 are energized thereby transmitting heat through the plate 44 to the contents of the vat. When the cooking fluid is brought to the desired temperature, as sensed by the temperature sensing element 78 and determined by the setting of the temperature in the control 14, the motor 50 (FIGURE 2) is energized by actuation of the toggle switch 15 on the control panel 14 to lower the rack 26, support 28 and the trays 30a through 30c into the vat 43. The door 22 is then closed to cover the vat and the cooking process is initiated. During cooking, the heated fluid rises through the foraminous trays thereby maintaining the temperature level substantially constant throughout the vat and cooking the potatoes at a substantially even rate.

Timing of cooking of the potatoes is important and it is necessary that the potatoes must be simultaneously removed from the vat at the desired time. This may be achieved by providing a timer in the control panel 14 which, when the desired time has expired, generates a signal so that, by manually opening the door 20 and suitably actuating the toggle switch 15, the motor 50 may be re-energized in the opposite direction to raise the rack 26 from the vat. As was described with reference to FIGURE 4, the travel of the rack 26 is automatically confined between the limits set between the limit switches 72a and 72b.

After raising of the rack 26 at the termination of the cooking cycle, the support 28 remains in a raised position above the vat to allow drainage of excess rosin from the potatoes contained thereon. The grid 32 is then raised to the position shown in FIGURE 9. The elongated slot 100d in the grid plate 66 and the elongated slots 100a through 100c in the tray side walls 84a through 84c serve to provide locking means to retain the grid 32 and the trays 30a through 30c in the vertical position. With the axles 64a through 64c positioned at the rearwardmost end of the slots, as shown in FIGURE 8, the space between the back of the grid 32 and the tray side walls and the back member 89 of the support 28 is such that the trays and grid may be rotated between the horizonal and vertical position. With the axles in the forward position in the slots, however, as is illustrated by the axle 64a and the slot 100a in FIGURE 9, the radius of the arc described by the back edge of the side wall 84a is increased to a point where simple downward rotation of the tray 30a causes that portion of the side wall to engage the back member 89 thereby effectively blocking and preventing simple pivotal motion of the grid and trays to the horizontal position. With specific reference to the tray 30a, return of the tray and grid to the horizontal position is accomplished by first lifting upwardly on the tray to thereby move the side wall 84a upwardly, so that the axle 64a moves toward the rearward extremity of the slot 100a, followed by downward pivotal motion of the tray 30a and side wall 84a to the horizontal position as is shown in FIGURE 8.

With the grid 32 in the position indicated in FIGURE 9, the tray 30a is first unloaded and the contents thereof wrapped or processed as required. Upon emptying of the tray 30a, it is rotated to the position shown in FIGURE 9 and the tray 30b is then unloaded. Upon unloading of the tray 30b, that tray is pivoted upwardly to the position shown in phantom in FIGURE 9, the notch 104 accepting the axle 64a and the corresponding floors 88a and 88b intermeshing to allow nesting storage of the trays in that position. The tray 30c is then unloaded and similarly pivoted upwardly, the notches 106 and 108 thereof accepting the axles 64a and 64b. Dut to the difference in elevation of the axles 64a through 64c, the legs 102a through 102c, and therefore the cross members 86a through 86c, with the trays in the vertical position, are staggered so that interengagement between the cross members and the corresponding side walls of the subjacent trays is avoided, thereby permitting the aforedescribed nesting of the trays in this position. Upon storage of the tray 30c, the remaining potatoes supported by the floor 88d are removed and unloading is completed.

It should be noted that, at any time during the unloading process, the support may be reintroduced into the vat 43 to reheat the rosin and maintain it in a liquid condition during the unloading process. This is accomplished by merely actuating the toggle switch 15 to lower the rack 26, maintaining the rack in the lowered position for a suitable length of time to enable re-liquefaction of the rosin on the potatoes and reactuating the toggle switch 15 to raise the rack 26 from the vat at which point, after suitable drainage, the unloading process may be resumed.

If it is desired to remove the entire support 28 from the rack 26 before the draining process is completed, the support may be placed on the door 20 and the remaining rosin, confined by the walls 22 thereon, will drain into the vat 43.

It should be understood that, in addition or in lieu of the specific configuration of the floors 88a through 88d, other undulating forms such as sinusoidal wave forms, square tooth forms, succeedingly narrow width or configurations in the shape of "buttress tooth" undulations may be utilized without exceeding the scope of the invention.

It should be noted that the trays can be unloaded by tilting and that means may be associated with the rack mechanism to tilt the individual trays to provide an automatic tray unloading apparatus for the invention.

It should be obvious that the size and shape of the apparatus may be changed to vary the quantity of potatoes or the type of food product to be handled as desired and that other changes can be made while relying on the principles taught.

What is claimed is:

1. An immersion cooking apparatus comprising:
   vat means,
   means for controllably supplying heat to the vat means,
   lifting means operatively associated with the vat means,
   rack means connected to the lifting means, the rack means being movable into and out of the vat means by actuation of the lifting means,
   support means disposed on the rack means; and
   a plurality of trays pivotally connected to the support means to permit positioning the trays in receiving and unloading positions.

2. The apparatus of claim 1 wherein the trays are shaped to be supported by one another when in material receiving position.

3. The apparatus of claim 1 wherein the trays are shaped to nest within one another when in the unloaded position.

4. The apparatus of claim 3 wherein each of the trays comprises a perforated floor means having an undulating cross-sectional configuration to divide the tray into material supporting and segregating troughs.

5. The apparatus of claim 4 wherein the floor means have an undulating saw tooth cross-sectional configuration.

6. A rack for immersion cooking apparatus comprising: support means, a plurality of trays, and means pivotally mounting the trays on the support means at vertically aligned, spaced points for limited movement of each tray parallel to the plane of the tray and for pivotal movement of the trays from parallel horizontal positions in spaced relationship to vertical positions in nesting relationship to one another.

7. A rack in accordance with claim 6 wherein the support means comprises: a pair of spaced vertical members, a back panel interconnecting the vertical members, and wherein the pivotal mounting means for the trays comprises transverse axles extending between the spaced vertical members engaging elongated slots disposed in the trays, the elongated slots extending parallel to the plane of each tray to permit said limited movement of the tray with the distance between the rear edge of a tray slot and the rear edge of that tray being less than the space between its respective axle and the back member to permit pivotal raising of each tray, and the distance between the forward edge of a tray slot and the rear edge of that tray being greater than the distance between its respective axle and the back member to normally block each tray from pivotal motion when the tray is pivoted to the vertical position and moved rearwardly and downwardly the distance allowed by said vertical slots.

8. The rack of claim 7 wherein the trays include a perforated floor having an undulating cross-sectional configuration to divide the surface of a tray into material supporting and segregating troughs.

9. The rack of claim 6 wherein the trays include a perforated floor having an undulating cross-sectional configuration to divide the tray into material supporting and segregating troughs.

10. The rack of claim 8 wherein the width of each tray is less than the width of the immediately subjacent tray and a cross member extends transversely across the free end of the trays and is of greater length than the width of the tray immediately subjacent thereto to provide support for the trays in the horizontal position.

References Cited

UNITED STATES PATENTS

| | | | |
|---|---|---|---|
| 791,212 | 5/1905 | Ramsey | 99—417 |
| 1,106,926 | 8/1914 | Copland | 99—410 |
| 1,228,790 | 6/1917 | Lambert | 211—150 XR |
| 2,570,374 | 10/1951 | Pompa | 99—416 |
| 2,982,419 | 5/1961 | Shiels | 211—150 XR |
| 3,294,009 | 12/1966 | Di Loreto et al. | 99—336 XR |

BILLY J. WILHITE, Primary Examiner

U.S. Cl. X.R.

99—417, 443, 448, 449; 211—150